United States Patent [19]
Geier et al.

[11] Patent Number: 5,205,571
[45] Date of Patent: Apr. 27, 1993

[54] EASY LIFT AIRCRAFT CHAIR CART

[76] Inventors: Allen J. Geier, 917 27th Ave. S., Wausau, Wis. 54401; George F. Engebrecht, 8435 14th Ave. S., Bloomington, Minn. 55425

[21] Appl. No.: 888,525

[22] Filed: May 26, 1992

[51] Int. Cl.⁵ .................... B62B 3/02; B62B 3/04; B62B 3/10
[52] U.S. Cl. ................... 280/47.35; 280/79.6; 248/501; 269/17; 269/296
[58] Field of Search ............... 280/79.11, 79.6, 47.131, 280/47.15, 47.17, 47.19, 47.24, 47.34, 47.35; 244/118.6; 248/501, 503.1; 254/8 R; 269/17, 296

[56] References Cited
U.S. PATENT DOCUMENTS

| 1,598,413 | 8/1926 | Armstrong | 280/47.34 X |
| 2,825,477 | 3/1958 | Ross | 269/17 X |
| 4,021,017 | 5/1977 | Adams | 254/8 R |
| 4,505,489 | 3/1985 | Specie | 280/47.131 |
| 4,723,732 | 2/1988 | Gorges | 248/503.1 X |
| 4,881,702 | 11/1989 | Slettebak | 244/118.6 |
| 4,934,720 | 6/1990 | Dobron | 280/79.11 |
| 5,005,846 | 4/1991 | Taylor | 280/30 |
| 5,050,898 | 9/1991 | Petrell, Jr. | 280/79.11 |
| 5,072,960 | 12/1991 | Sperko | 280/47.34 |

Primary Examiner—Brian Johnson
Attorney, Agent, or Firm—Tipton L. Randall

[57] ABSTRACT

A cart apparatus for lifting and moving aircraft chair units is described. The cart comprises a U-shaped frame with two sets of swivel-mounted casters on the bottom of the frame for mobility. A pair of upright support tube members with angle support members at their ends extend above the frame to support the rear stretcher bar of the chair unit. The baggage bar of the chair unit is held in place by a stop at the end of each leg of the U-shaped frame. A releasable retaining device for holding the baggage bar against the stop is also provided. The cart enables a single person to easily place the chair unit on the cart and move the cart and chair unit from place to place.

16 Claims, 1 Drawing Sheet

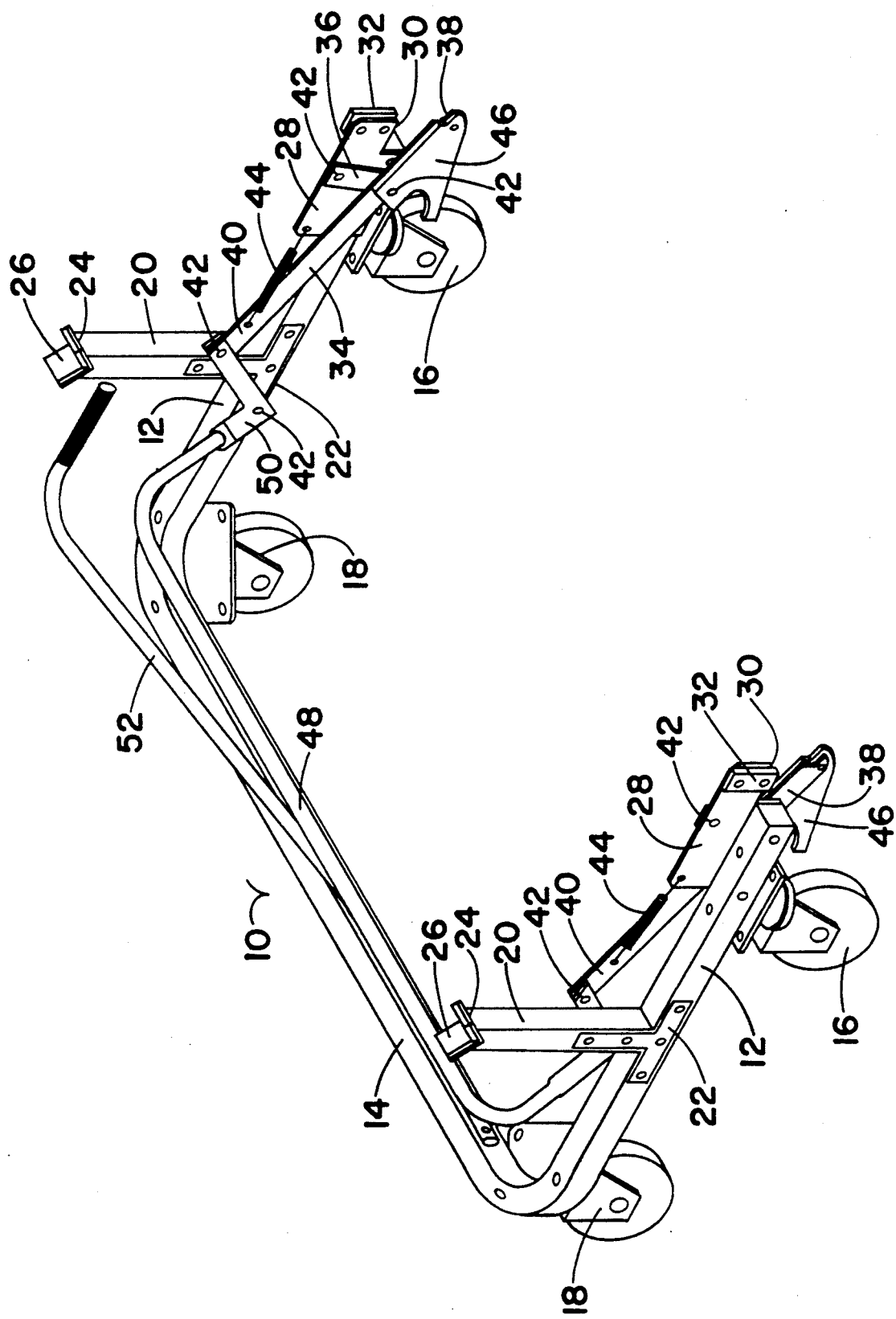

EASY LIFT AIRCRAFT CHAIR CART

BACKGROUND OF THE INVENTION

1. Field of the Invention

This invention relates to an apparatus for lifting and transporting an aircraft chair unit.

2. Information Disclosure Statement

In the servicing and maintenance of passenger aircraft, it is periodically necessary to remove the passenger seats from the aircraft cabin area. Depending on the size of the aircraft, the passenger seats are manufactured and installed in units of two, three, four or more seats. The units have leg supports which are attached to a frame under each side of the chair seat and are secured at front and rear points to the cabin floor in special tracks. Adjacent chairs share a common leg support unit. A single horizontal rear stretcher bar traverses the whole chair unit at the junction of the seats and backs, providing a strong framework for the chair unit. A baggage bar traverses the whole chair unit just above floor level and is attached to the leg supports at the front of the chair unit. The bar retains baggage under each seat.

The chair units remain in tact during aircraft servicing and maintenance and thus, removing these seating units from the aircraft can be awkward. Each individual seat may weigh as much as 200 pounds, thus a unit of two or more seats requires two or more workers to lift and carry the unit from the aircraft. Once removed, the seating units may be washed, recovered, serviced, etc. and moved from one place to another. Each move requires at least two workers to carry the seat unit.

A number of carts have been described but none of these are applicable to the transport of aircraft seat units. In U.S. Pat. No. 4,934,720 Dobron describes a mobile cart having adjustable supports. Taylor in U.S. Pat. No. 5,005,846 discloses a jet ski transporter carriage with rails forming part of the framework. A mobile platform for a snowplow is described by Petrell in U.S. Pat. No. 5,050,898 while in U.S. Pat. No. 5,072,960 Sperko discloses a sterilizer cart with a pair of rails mounted on the frame.

It is an objective of the invention to provide a chair unit cart which securely holds the chair unit off the floor and allows the chair unit and cart to be moved to and from an aircraft and between servicing operations.

It is a further objective to provide a chair unit cart onto which a single individual can load and unload a chair unit without risking back injury caused by heavy lifting.

Applicants have devised an easy lift aircraft chair cart which enables one person to lift any size chair unit onto the cart and easily transport the chair unit and cart to and from an aircraft and between servicing operations.

SUMMARY OF THE INVENTION

The cart of the present invention comprises;

a planar U-shaped main frame element with generally parallel leg portions and perpendicular transverse portion;

wheel means attached to said main frame from below said planar frame so that said frame can be moved;

a pair of upright support tube members each attached at one end to a frame leg at a point about equidistant between each leg end and said transverse frame portion, said upright support tube members oriented perpendicular to and above said planar main frame element and in opposite orientation to said wheel means;

a support member attached to each upright support tube member, at an end opposite the upright support tube end attached to the frame leg, for supporting a chair unit;

a stop means attached to and extending beyond each of said frame legs end opposite said transverse frame portion;

a movable retaining means extending beyond each of said frame legs end opposite said transverse frame portion, said retaining means oriented in opposition to said stop means for retaining a baggage bar against said stop means; and a release means for moving said retaining means out of opposition with said stop means to release a baggage bar therefrom. In the preferred embodiment of the cart invention, the wheel means comprise two pairs of swivel-mounted casters fastened to the frame legs. The retaining means for the baggage bar is preferably a spring biased baggage bar hook member while the release means is a U-shaped kick bar with in-line right angle legs attached to both the frame and the baggage bar hook member.

BRIEF DESCRIPTION OF THE DRAWING(S)

The FIGURE illustrates a chair unit cart constructed according to the invention.

DESCRIPTION OF THE PREFERRED EMBODIMENTS

Referring to the FIGURE, the aircraft chair cart comprises a planar U-shaped main frame 10 with parallel leg portions 12, and perpendicular transverse portion 14. The open end of the frame will be referred to as the front and the closed end as the back. Two pairs of swivel-mounted casters are attached to the bottom of the frame 10. One each of the first pair of casters 16 is attached to the front of the frame at each frame leg, while one each of the second pair of casters 18 is attached to the back of the frame at each frame leg. This provides a sturdy, stable, base configuration for the cart.

Each one of a pair of upright support tube members 20 is attached to a frame leg 12 at a point approximately equidistant between the front and back caster on each leg. The upright support tube members 20 are perpendicular to and above the main frame 10 and opposite the pairs of casters 16,18. Each upright support tube member 20 may optionally have one or more generally T-shaped support plates 22 attached to both the frame leg 12 and the upright support tube member 20 to strengthen the upright support tube attachment to the leg. A pair of support plates on opposite sides of the attachment point provide for maximum strength. A support angle member 24 is attached to each upright support tube member 20 at the end opposite the frame leg 12. The V-shaped support angle member 24 is oriented with the opening upward. This angle support member 24 supports the rear stretcher bar of the chair unit as will be described later. Optional support angle pad 26 may be fastened inside the opening of the support angle to protect the stretcher bar of the chair unit.

The front end of each frame leg 12 has a generally rectangular shaped top baggage bar stop 28 attached thereto. The bar stop 28 is positioned above the plane of the frame 10 and extends beyond the front end of each frame leg 12. The lower edge 30 of the bar stop 28 beyond the front end of the frame leg 12 is approximately parallel and even with the top of the leg 12. An optional bar stop pad 32 is attached to the bar stop 28 and extends slightly below the lower edge 30 of the stop, to cushion and protect the baggage bar while the chair unit is on the cart.

In order to securely hold the chair unit once it is on the cart, a baggage bar hook assembly is provided to hold the baggage bar portion of the chair unit securely against the baggage bar stop 28. The hook assembly is made up of a baggage bar hook member 34 and a strap hanger 36. The baggage bar hook member 34 of the assembly is a rigid, elongated rectangular strap, positioned diagonally with respect to the plane of the frame leg and inside the U-shaped frame. The hook end 38 of the bar hook member extends beyond and below the front end of the frame leg 12, while the blunt end 40 of the bar hook member extends back away from and above the end of the frame leg 12. The bar hook member is supported near the hook end by the strap hanger 36 fastened to the hook end 38 and top baggage bar stop 28 by rotatable fasteners 42. The blunt end 40 of the baggage bar hook member is rotatably fastened to a release means described below.

A biasing means, such as a spring 44, fastened between the top baggage bar stop 28 and the hook member blunt end 40, holds the baggage bar hook end 38 in opposition with the top baggage bar stop 28 to secure the baggage bar therebetween. A baggage bar hook pad 46 is optionally attached to the hook end 38 to prevent damage to the baggage bar by the hook member while the chair unit is on the cart.

A release means is provided which moves the baggage bar hook member 34 out of opposition with the baggage bar stop 28 to release the baggage bar. The release means comprises a U-shaped kick bar 48 with an in-line right angle leg 50 attached at each end. This bar and leg unit fits within the U-shaped frame and is attached near the rear of the frame. The kick bar is rotatably attached to the frame leg 12 at the in-line right angle leg junction with the U-shaped kick bar. The end of the right angle leg 50 is rotatably attached to the blunt end 40 of the baggage bar hook member 34. Pushing down on the kick bar 48 pivots the right angle leg 50 toward the back of the cart and moves the baggage bar hook 34 out of opposition with the top baggage bar stop 28 to release the baggage bar held between them.

An optional cart handle 52 for use when the cart is empty is attached to the transverse portion 14 of the U-shaped frame. The handle is rotatably attached to the inside of the U-shaped frame and swings down to a position parallel and adjacent to the transverse portion 14 of the frame for out of the way storage when a chair unit is on the cart. The great utility and ease of operation of the aircraft chair cart will be appreciated upon an explanation of the use of the cart. A single worker can easily load, move, and unload a chair unit with this cart. After the chair units in a aircraft are detached from the floor, the cart is moved under the chair unit from the rear. The U-shaped frame allows the front of the cart under the chair unit with the frame legs located between the chair leg supports. The chair unit is tipped forward on the front chair leg supports with a minimum of effort. The cart is pushed forward until the first pair of caster wheels contacts the baggage bar. The chair unit then is tipped back down onto the cart. As the chair unit drops down onto the cart, the stretcher bar contacts the support angle member 24 and, as the worker continues to tip back the chair unit, the whole unit supported on the angle members 24 pivots on the stretcher bar. The baggage bar then slides past the spring biased hook member 34, displacing it toward the back of the cart and contacts the top bar stop 28. The biasing means attached to the hook assembly brings the hook end 38 back into opposition with the under side of baggage bar. The cart is sized to bring the chair unit about three inches off the floor. The securely joined chair unit and cart can be moved about by a single worker. The swivel casters allow the chair unit and cart to be moved in any direction with ease.

Removing the chair unit from the cart is likewise easily accomplished. The cart is pushed forward to align the caster wheels. Pushing the baggage bar hook release 48 down and tipping the chair unit forward contacts the floor with the front chair leg supports. While supporting the chair unit from behind, pull the cart from beneath it and let the chair unit down on the leg supports.

The cart is designed for use in larger aircraft. Some chair units on these aircraft weigh as much as two hundred pounds. Such a chair can be tipped forward with thirty-five to forty pound of force which can be provided by a worker from a standing position, thus reducing the possibility of back injuries.

The cart can be built to fit any chair unit. The cart dimensions can be varied to accommodate chair units with different rear stretcher bar heights and leg width.

From the foregoing description, one skilled in the art can easily ascertain the essential characteristics of the invention and, without departing from the spirit and scope thereof, make various changes and modifications to adapt it to various usages.

We claim:

1. An easy lift aircraft chair unit cart apparatus comprising;
    a planar U-shaped main frame element with generally parallel leg portions and perpendicular transverse portion;
    wheel means attached to an undersurface of said planar main frame element;
    a pair of upright support tube members each attached at one end to a frame leg portion at a point about equidistant between each frame leg portion end and said transverse frame portion, said upright support tube members oriented perpendicular to and above said planar main frame element and in opposite orientation to said wheel means;
    a support member attached to each upright support tube member at an end opposite the upright support tube end attached to the frame leg portion for supporting a chair unit;
    a stop means attached to and extending beyond each of said frame leg portion ends, opposite said transverse frame portion;
    a movable retaining means movably mounted to and extending beyond each of said frame leg portion ends, opposite said transverse frame portion, said retaining means oriented in opposition to said stop means for retaining a chair unit baggage bar against said stop means; and
    a release means for moving said retaining means out of opposition with said stop means to release said baggage bar therefrom.

2. A cart according to claim 1 wherein said wheel means comprise swivel-mounted casters.

3. A cart according to claim 1 wherein said support member comprises a V-shaped angle member.

4. A cart according to claim 1 further comprising one or more support plates attached to said upright support tube member and said frame leg portions to strengthen the attachment of said upright member to said frame leg portion.

5. A cart according to claim 1 wherein said movable retaining means comprises a baggage bar hook assembly.

6. A cart according to claim 1 further comprising a biasing means for maintaining said movable retaining means in opposition to said stop means and for retaining said baggage bar against said stop means.

7. A cart according to claim 1 wherein said release means is rotatably attached to both said movable retaining means and said frame leg portion.

8. An easy lift aircraft chair unit cart apparatus comprising;
   a planar U-shaped main frame element with generally parallel leg portions and perpendicular transverse portion;
   first and second pairs of swivel-mounted casters attached to an undersurface of said planar main frame element, each caster of said first pair attached to said frame leg portion near an end opposite said transverse frame portion and each caster of said second pair attached to said frame leg portion at a point adjacent said transverse frame portion;
   a pair of upright support tube members each attached at one end to a frame leg portion at a point about equidistant between the two casters on each leg portion, said upright support tube members oriented perpendicular to and above said planar main frame element and in opposite orientation to said pairs of casters;
   a support angle member attached to each upright support tube member at an end opposite the upright support tube end attached to the frame leg portion for supporting a rear stretcher bar of a chair unit;
   a top baggage bar stop attached to and extending beyond each of said frame leg portion ends, opposite said transverse frame portion;
   a movable baggage bar hook assembly diagonally oriented with said frame leg portion and rotatably attached to both said top baggage bar stop and a release means;
   biasing means to maintain said baggage bar hook assembly in opposition with said top baggage bar stop to retain a baggage bar therebetween; and
   said release means rotatably attached to both said frame leg portion and said baggage bar hook assembly for moving said baggage bar hook assembly out of opposition with said top baggage bar stop to release a chair unit baggage bar therefrom.

9. A cart according to claim 8 further comprising one or more generally T-shaped support plates attached to said upright support tube member and said frame leg portion to strengthen the attachment of said upright support tube member to said frame leg portion.

10. A cart according to claim 8 further comprising a support angle pad fastened inside an opening in said support angle member.

11. A cart according to claim 8 further comprising a baggage bar stop pad attached to said top baggage bar stop and extending below a lower edge of said top baggage bar stop, beyond said frame leg portion end.

12. A cart according to claim 8 wherein said baggage bar hook assembly comprises a baggage bar hook member with blunt and hook ends and a strap hanger with said strap hanger rotatably attached to said bar stop and said hook end and with said blunt end rotatably attached to said release means.

13. A cart according to claim 12 further comprising a baggage bar hook pad attached to said baggage bar member hook end.

14. A cart according to claim 8 wherein said biasing means to maintain said baggage bar hook assembly in opposition to said top baggage bar stop is a spring connected between said baggage bar hook assembly and said top baggage bar stop.

15. A cart according to claim 8 wherein said release means for said baggage bar hook assembly is a U-shaped kick bar with in-line right angle leg ends, said bar attached to the frame leg portion at right angle leg junctions and the right angle leg ends are attached to the blunt end of said baggage bar hook assembly.

16. A cart according to claim 8 further comprising a handle rotatably attached at one end to said transverse frame portion, said handle configured to store in a position parallel and adjacent said transverse frame portion.

* * * * *